United States Patent
Gemme et al.

(10) Patent No.: US 7,035,399 B2
(45) Date of Patent: Apr. 25, 2006

(54) NETWORK INTERFACE DEVICE (NID) WITH ELLIPOSOIDIAL SHAPE AND STORED CABLE REEL AND ASSOCIATED METHODS

(75) Inventors: Christopher P. Gemme, Hickory, NC (US); Mark E. Alrutz, Hickory, NC (US); Mark O. Vogel, Statesville, NC (US); Martin B. Lee, Denver, NC (US)

(73) Assignee: Commscope Properties, LLC, Sparks, NV (US)

( * ) Notice: Subject to any disclaimer, the term of this patent is extended or adjusted under 35 U.S.C. 154(b) by 350 days.

(21) Appl. No.: 10/640,817

(22) Filed: Aug. 14, 2003

(65) Prior Publication Data

US 2004/0234070 A1 Nov. 25, 2004

Related U.S. Application Data

(63) Continuation-in-part of application No. 10/440,995, filed on May 19, 2003.

(51) Int. Cl.
*H04M 9/00* (2006.01)

(52) U.S. Cl. .................. 379/413.03; 379/413.04; 379/413.02

(58) Field of Classification Search .......... 379/413.02, 379/413.03, 413.04
See application file for complete search history.

(56) References Cited

U.S. PATENT DOCUMENTS

| | | | |
|---|---|---|---|
| 1,509,717 A | 9/1924 | Davis | |
| 3,589,640 A | 6/1971 | Mapes | |
| 4,451,013 A | 5/1984 | Bedrosian | 242/118.4 |
| 4,945,559 A | 7/1990 | Collins et al. | 379/399 |
| 4,949,376 A | 8/1990 | Nieves et al. | 379/399 |
| D314,759 S | 2/1991 | Collins et al. | D13/184 |
| 5,060,882 A | 10/1991 | Rousculp et al. | 242/99 |
| 5,450,469 A | 9/1995 | Pamart et al. | 379/27 |
| 5,633,926 A | 5/1997 | Cannetti | 379/440 |
| 5,692,701 A | 12/1997 | Holliday | 242/598.5 |
| 5,754,643 A | 5/1998 | Decker et al. | 379/399 |
| 5,806,787 A | 9/1998 | Schneider | 242/598.5 |
| D415,118 S | 10/1999 | Stanush et al. | D13/184 |
| 6,104,806 A | 8/2000 | Daoud | 379/399 |
| 6,201,920 B1 | 3/2001 | Noble et al. | 385/134 |
| 6,229,890 B1 | 5/2001 | Kerr et al. | 379/399 |
| 6,307,933 B1 | 10/2001 | Stehlin et al. | 379/399 |
| 6,360,675 B1 | 3/2002 | Jones | 108/50.02 |

*Primary Examiner*—Jefferey F. Harold
(74) *Attorney, Agent, or Firm*—Allen, Dyer, Doppelt, Milbrath & Gilchrist, P.A.

(57) ABSTRACT

A NID includes a base having a network area and a customer area adjacent thereto. The NID may also include a cable reel carried by the base. An access cover may be provided for the cable reel and the base that may include a network cover door for the network area, and a customer cover door for the customer area. The access cover may have a shape defined by at least a portion of an ellipsoid. The shape of the access cover may be defined by half an ellipsoid with major and minor axes adjacent the base, and the base may have an elliptical shape. The cable reel may be rotatable with the base or rotatable independent thereof.

44 Claims, 3 Drawing Sheets

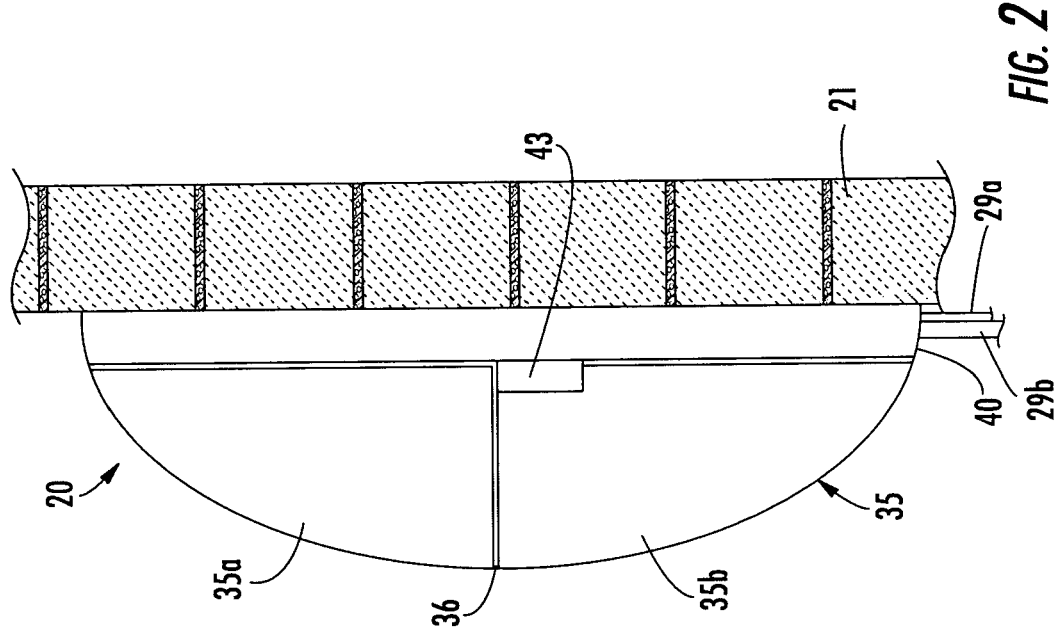
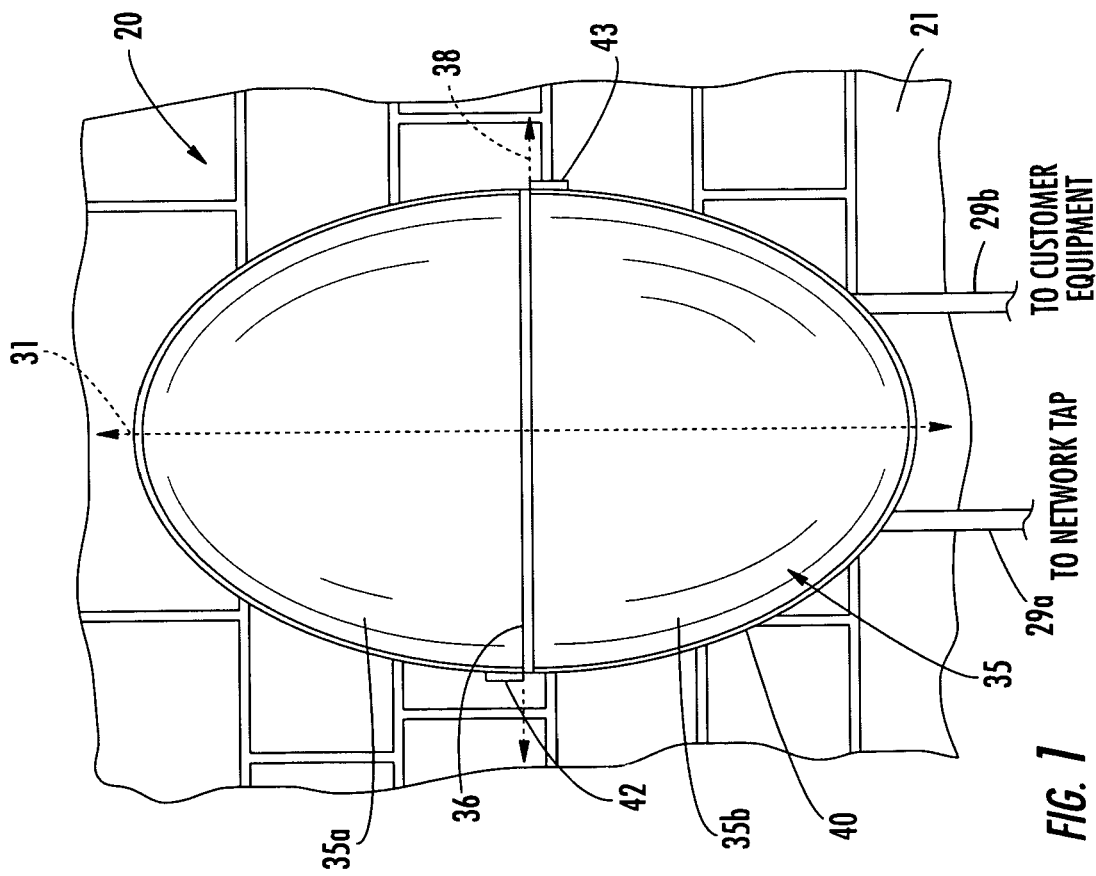

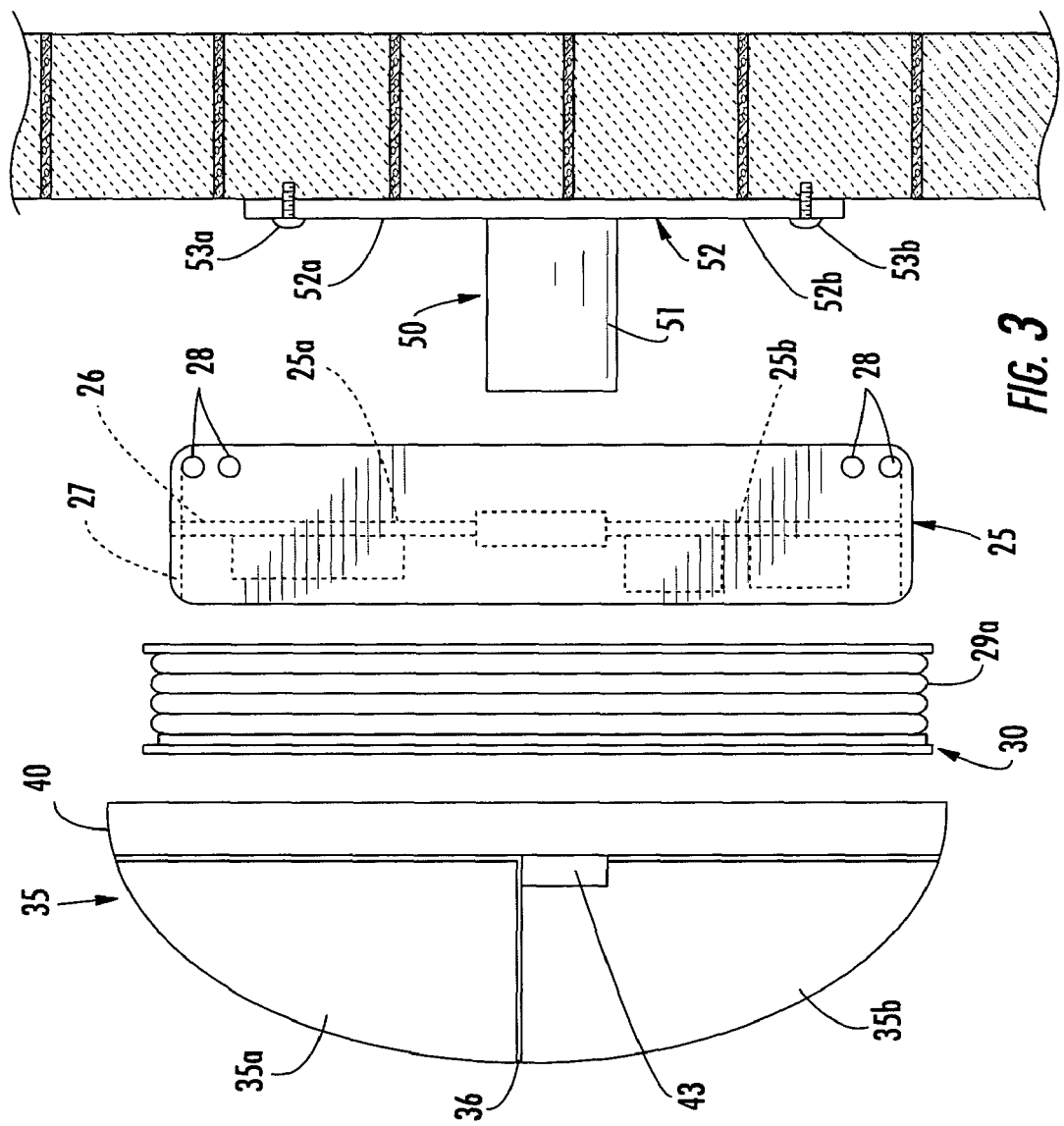

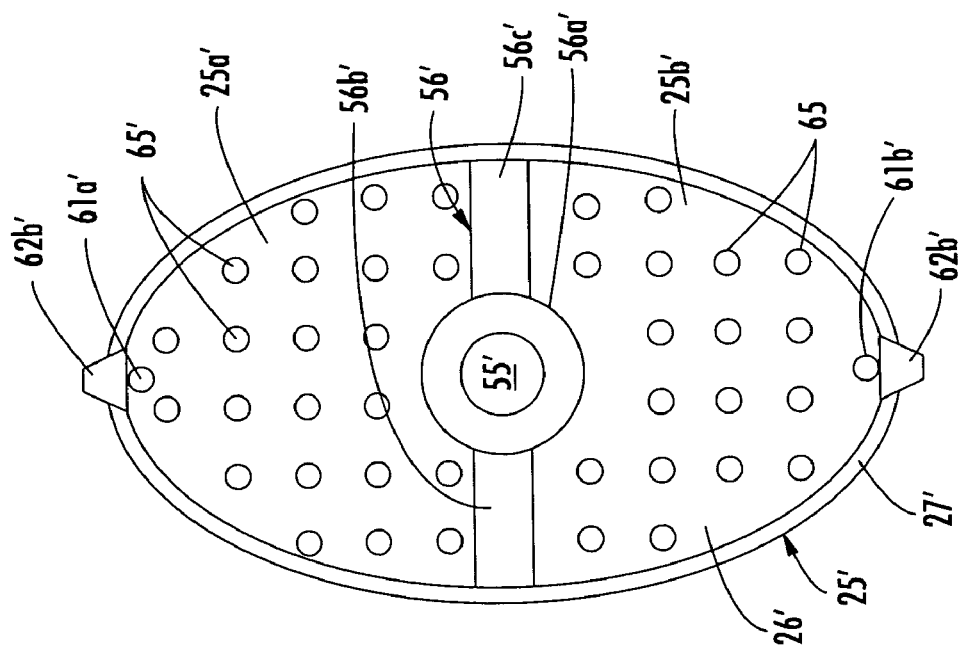
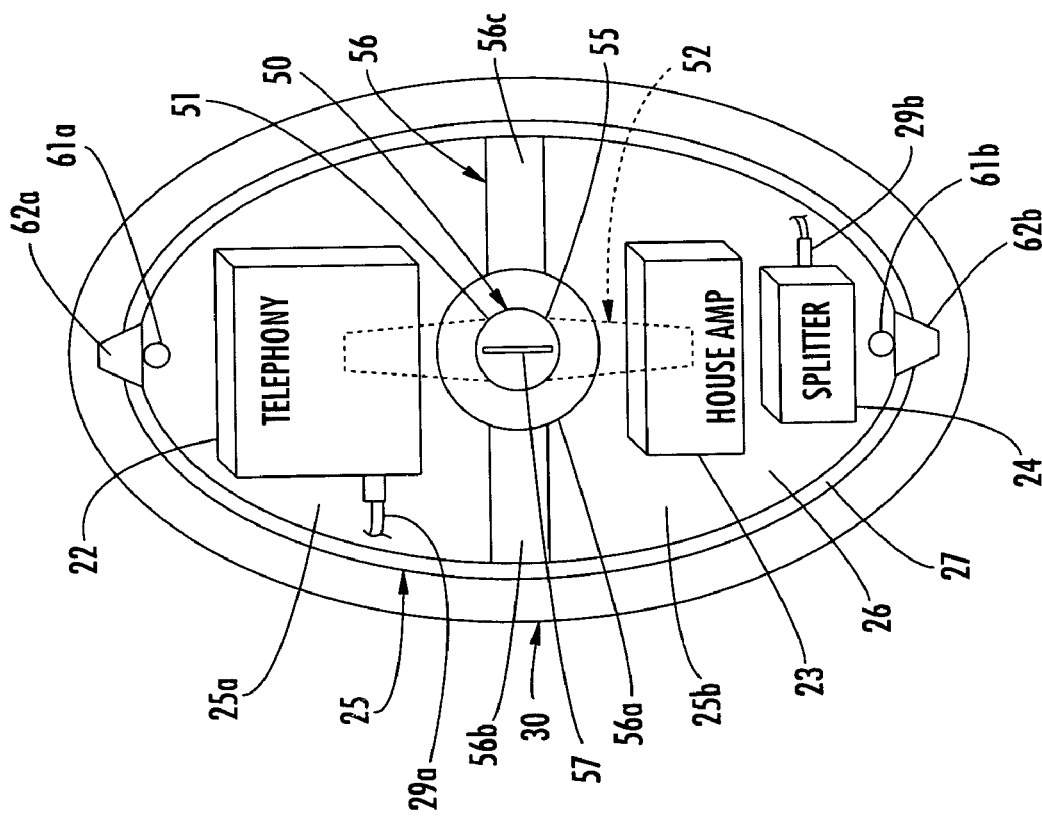

NETWORK INTERFACE DEVICE (NID) WITH ELLIPOSOIDIAL SHAPE AND STORED CABLE REEL AND ASSOCIATED METHODS

RELATED APPLICATION

The present application is a continuation-in-part of U.S. patent application Ser. No. 10/440,995, filed May 19, 2003, the entire disclosure of which is incorporated herein by reference.

FIELD OF THE INVENTION

The present application relates to communications, and, more particularly, to a network interface device and associated methods.

BACKGROUND OF THE INVENTION

Coaxial cables are widely used to carry high frequency electrical signals. Coaxial cables enjoy a relatively high bandwidth, low signal losses, are mechanically robust, and are relatively low cost. A coaxial cable typically includes an elongate inner conductor, a tubular outer conductor, and a dielectric separating the inner and outer conductors. For example, the dielectric may be a plastic foam material. An outer insulating jacket may also be applied to surround the outer conductor.

Coaxial cables may advantageously be used to connect to a tap at a ground pedestal or at an overhead line to carry signals from the tap to the customer. The tap is, in turn, connected to a trunk cable that typically serves a number of customers. Fiber optic, and electrical multi-conductor cables may alternately or additionally be so configured for such a customer drop application.

Typically an installer carries one or more relatively large reels of drop cable to an installation site to connect the customer to the trunk cable. The approximate length of cable, and some slack, that is needed for the particular drop installation, is manually pulled and then cut from the larger supply on the reel. Both ends of the cable are prepared by installing respective connectors onto ends of the cable. The connectors at the ends of the cable are then respectively coupled to mating connectors at the tap and also at the customer's interface. Unfortunately, this installation procedure is relatively time consuming and uses field-installed connectors that may not be as good and/or reliable as factory-installed connectors. Sometimes one or more of the connectors may not be installed properly. In addition, a considerable and uncontrolled amount of waste cable may be produced by this conventional installation approach.

Relatively long lengths of cable, such as for trunk applications, are typically designed in advance. Accordingly, a pre-connectorized cable can be made at the manufacturing facility with its attendant advantages. For example, U.S. Pat. No. 4,451,013 to Bedrosian discloses a reel for a pre-connectorized telephone cable.

Unfortunately, for drop cable applications, the labor intensive manual approach is typically used. Pre-connectorized cables are not typically available. In addition, there may be no convenient manner to store slack at the drop installation even if a pre-connectorized cable were used.

A network interface device (NID) is commonly provided as a demarcation between the customer's wiring and the network or service provider's wiring. A typical NID, such as disclosed in U.S. Pat. No. 4,945,559 to Collins et al., includes a base having a network side and a customer side. The base may be mounted to the outer wall of customer's residence, for example. A cover is connected to the base and protects the customer and network components from the elements. The NID cover includes side-by-side pivoting doors that permit selective access to the customer and network sides. U.S. Pat. No. Des 314,759 also to Collins et al. discloses a NID cover having a corner portion that is hinged to permit selective access.

U.S. Pat. No. Des. 415,118 to Stanush et al. discloses a NID having a single hinged cover having a generally rectangular outline with slightly rounded edges. U.S. Pat. No. 5,754,643 to Decker et al. discloses a NID having a generally rectangular cover that is vertically slidable onto a base and that is rounded over on opposing vertical edges, like a longitudinal section through a cylinder.

Although various NID configurations have been disclosed in the prior art, not all configurations provide for a compact, and/or aesthetically pleasing appearance. In addition, such NIDs have not provided convenient storage of larger amounts of cable therein.

SUMMARY OF THE INVENTION

In view of the foregoing background, it is therefore an object of the invention to provide a NID that is relatively compact and that may be helpful to the installer such as for storing and/or dispensing the cable for the customer connection.

These and other objects, features and advantages in accordance with the invention are provided by a NID including a base comprising a network area and a customer area adjacent thereto, and that in some advantageous embodiments, also includes a cable reel carried by the base. An access cover may be provided for the cable reel and the base. In some embodiments, the access cover may comprise a network cover door for the network area, and a customer cover door for the customer area. The access cover may also include just a single cover door in other embodiments. The access cover may have a shape defined by at least a portion of an ellipsoid. Accordingly, the NID may be relatively compact and/or be advantageous for storing cable therein.

The shape of the access cover may be defined by half an ellipsoid with major and minor axes adjacent the base, and the base itself may have an elliptical shape. The network cover door and the customer door may extend inwardly from respective opposing longitudinal ends of the access cover to define a joint therebetween aligned in parallel with the minor axis. The access cover may further comprise a cover ring carried by the base. The network and customer cover doors may each be pivotally connected to the cover ring.

The base may comprise an elliptical panel and a flange connected to peripheral portions thereof. Accordingly, the elliptical panel may be spaced from forward and rearward ends of the flange.

The cable reel may also have an elliptical shape. In addition, the cable reel may be rotatable and further comprise a lock for selectively locking the cable reel from rotation. In one class of embodiments, the cable reel is rotatably carried by the base. In another class of embodiments, the base comprises a rotatable mounting device for rotatably mounting the base to a mounting surface so that the cable reel is carried by the base and is rotatable therewith.

The rotatable mounting device may comprise a bracket to be mounted to the mounting surface, and an arbor extending outwardly therefrom. The base may have an opening therein receiving the arbor.

The NID may further comprise at least one network device carried by the network area of the base, and at least one customer device carried by the customer area of the base. The base may comprise an elliptical panel with an array of mounting features associated therewith. Accordingly, the at least one network device and customer device may be mounted via respective ones of the mounting features.

A method aspect of the invention is for making NID and may include providing a base comprising a network area and a customer area adjacent thereto, and connecting an access cover to the base. The access cover may include a network cover door for the network area and a customer cover door for the customer area. The access cover may have a shape defined by a half-ellipsoid, for example.

Another method aspect of the invention is for using a NID comprising a base including a network area and a customer area adjacent thereto. The NID may also include an access cover comprising a network cover door for the network area and a customer cover door for the customer area. The method may include positioning a cable reel within the access cover. In some embodiments, the access cover may have the half-ellipsoid shape, for example.

BRIEF DESCRIPTION OF THE DRAWINGS

FIG. 1 is a front elevational view of the NID in accordance with the present invention mounted to a customer's wall.

FIG. 2 is a side elevational view of the NID as shown in FIG. 1.

FIG. 3 is an exploded side elevational view of the NID as shown in FIG. 1.

FIG. 4 is a front elevational view of the NID of FIG. 1 with the access cover removed.

FIG. 5 is a front elevational view of an alternate embodiment of the base for the NID of FIG. 1.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

A NID 20 in accordance with the invention is initially described with reference to FIGS. 1–4. As shown in FIGS. 1 and 2, the NID 20 may be mounted to a wall 21 of a customer's or subscriber's home or business. The NID 20 includes a base 25 comprising a network area 25a and a customer area 25b adjacent thereto. In the illustrated embodiment, the network area 25a is provided in the upper portion of the NID 20, while the customer area 25b is provided in the lower portion. Of course in other embodiments, alternate positions for the network and customer areas 25a, 25b may be used.

As shown in FIG. 4, the network area 25a carries a telephony module 22, and the customer area 25b carries both a house amplifier 23 and a signal splitter 24. Many other interface and/or terminating devices may also be carried by the NID 20 as will be appreciated by those skilled in the art. Indeed, the NID 20 may be used to connect the customer to cable TV services, telephony services, and/or other broadband or narrowband communications services.

A network cable 29a extends outwardly from the NID 20 to a tap of the network system cable (not shown). Similarly, a customer cable 29b illustratively extends from the NID 20 for connection to the customer's equipment (not shown). The network and/or customer cables 29a, 29b may be fiber optic cables, coaxial cables, single or multi-conductor cables, for example. Multiple cables may also be used.

The network cable 29a, for example, may advantageously be a pre-connectorized cable for certain installations to thereby remove the need for the installer to install a connector in the field. Accordingly, the installation time may be reduced and the quality of the connector more carefully controlled as will be appreciated by those skilled in the art.

In the illustrated embodiment, the NID 20 includes a cable reel 30 carried by the base 25. The cable reel 30 may be used during installation to dispense cable 29a therefrom, and store any remaining slack after installation as described in greater detail below.

An access cover 35 is provided to cover the cable reel 30 and the base 25. The access cover 35 comprises a network cover door 35a for the network area 25a, and a customer cover door 35b for the customer area 25b. In other embodiments, the access cover 35 may be provided by a single cover door (not shown) as will be appreciated by those skilled in the art.

The access cover 35 illustratively has a shape defined by at least a portion of an ellipsoid. More particularly, the shape of the access cover 35 is defined by half an ellipsoid with major axis 37 and minor axis 38 (FIG. 1) adjacent the base 25. The base 25 illustratively also has an elliptical shape. The network cover door 35a and the customer cover door 35b extend inwardly from respective opposing longitudinal ends of the access cover 35 to define a joint 36 therebetween aligned in parallel with the minor axis 38. Accordingly, the NID 20 may be relatively compact and aesthetically pleasing. The NID 20 may also be advantageous for storing cable therein.

The access cover 35 may further comprise a cover ring 40 carried by the base 25 and that pivotally mounts the cover doors 35a, 35b so that the doors swing horizontally open in opposite directions, for example. The cover ring 40 may connect to upper and lower mounting posts 61a, 61b carried by the elliptical panel 26 of the base 25, for example. Other mounting arrangements of the access cover 35 are also contemplated by the present invention.

Respective latches 42, 43 are illustratively provided to permit an installer or customer to gain access to respective areas of the NID 20 as will be appreciated by those skilled in the art. The latches 42, 43 may include locking arrangements (not shown) to further limit access. Of course, other mounting arrangements for the cover doors 35a, 35b may also be used, such as, for example, opening of the doors in the vertical direction.

The base 25 illustratively includes an elliptical panel 26 and a flange 27 connected to peripheral portions thereof. Accordingly, the elliptical panel 26 may be spaced from forward and rearward ends of the flange 27, as perhaps best appreciated with reference to FIG. 3. Cable knock-outs or openings 28 may be provided in the base 25 as also shown in FIG. 3.

The cable reel 30 illustratively also has an elliptical shape. The cable reel 30 can be selectively secured to the base 25 by removable upper and lower clips 62a, 62b, for example.

The base 25 illustratively comprises a rotatable mounting device 50 for rotatably mounting the base to a mounting surface, such as the wall 21, so that the cable reel 30 is carried by the base and is rotatable therewith. The rotatable mounting device 50 illustratively includes a bracket 52 having upper and lower legs 52a, 52b mounted to the wall 21 or other mounting surface using respective upper and lower fasteners 53a, 53b. The rotatable mounting device 50 also includes an arbor 51 extending outwardly from the bracket 52. A lock 57 (FIG. 5) is schematically illustrated and may be used for selectively locking the cable reel 30 and base 25 from rotation.

The base 25 has an opening 55 therein receiving the arbor 51. The elliptical panel 26 also illustratively includes increased thickness portions to provide reinforcement for rotatable mounting on the arbor 51. As shown perhaps best in FIG. 4, these increased thickness portions include a center ring 56a, as well as left and right increased thickness bands 56b, 56c extending from the center ring to the flange 27. Other configurations are also possible as will be understood by those skilled in the art.

Rotatable mounting of the cable reel 30 may also be accomplished without rotatable mounting of the base 25 in other embodiments. More particularly, in such embodiments the cable reel 30 may have a core that is rotatable on the arbor 51, for example.

Rotatable mounting of the cable reel 30 is advantageous, as it may permit an installer to first mount the reel to the wall 21, and then pay out the desired length of cable 29a to reach and connect to the network tap. Of course, in other embodiments, the cable reel 30 may be mounted to a temporary support during payout of the cable 29a, so that rotatable mounting within the NID 20 is not needed. Such embodiments may still enjoy the advantages of the half-ellipsoid shape of the access cover 35, such as compactness, aesthetics, etc. In addition, if the cable 29a is pre-connectorized, the remaining slack cable can be conveniently stored within the NID 20 as will be appreciated by those skilled in the art.

Although the primary use of the cable reel 30 may likely be for slack storage of the network cable 29a, in other applications, the cable reel 30 may be used to store slack of the customer cable 29b. Of course, in yet other embodiments, reels for both cables can be stored within the NID 20.

Turning now additionally to FIG. 5, another embodiment of the base 25' is now described. In this embodiment, the base 25' comprises an elliptical panel 26' with an array of mounting features 65 associated therewith. For example, the mounting features 65 may comprise an array of openings, such as to receive fasteners to secure the network and/or customer devices to the base. In other embodiments, the mounting features 65 may be provided by upstanding posts or pins to facilitate mounting of the devices as will be appreciated by those skilled in the art. Those other elements of the base 25' not specifically described are similar to those already described above and need no further discussion.

A method aspect of the invention is for making a NID 20 as described herein. The method may include providing a base 25 comprising a network area 25a and a customer area 25b adjacent thereto, and connecting an access cover 35 to the base. The access cover 35 may include a network cover door 35a for the network area, and a customer cover door 35b for the customer area. Moreover, the access cover 35 may have a shape defined by a half-ellipsoid.

Another method aspect of the invention is for using a NID 20 comprising a base 25 including a network area 25a and a customer area 25b adjacent thereto. The NID 20 may also include an access cover 35 comprising a network cover door 35a for the network area 25a, and a customer cover door 35b for the customer area 25b. Moreover, the method may include positioning a cable reel 30 within the access cover 35.

The half-ellipsoidal shape of the access cover 35 and the storage of the cable reel 30 within the NID 20 are features which may be used in combination or separate from each other, as will be understood by those skilled in the art. As will also be understood by those skilled in the art, these concepts may be extended to other similar applications, such as, for example, routing of gas lines to a customer's location, where the gas line is in the form of a flexible conduit. Yet another application is the provision of a portable telephone handset within a half-ellipsoidal housing, for example, such as for field telephone applications.

The advantages and features described herein are also applicable to a NID including an access cover with a half-spheroid shape. Such a half-spheroid shape would more readily accommodate a circular cable reel, for example. Accordingly, many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the appended claims.

The invention claimed is:

1. A network interface device (NID) comprising:
   a base comprising a network area and a customer area adjacent thereto;
   a cable reel carried by said base; and
   an access cover for said cable reel and said base;
   said access cover having a shape defined by at least a portion of an ellipsoid.

2. A NID according to claim 1 wherein the shape of said access cover is defined by half an ellipsoid with major and minor axes adjacent said base; and wherein said base has an elliptical shape.

3. A NID according to claim 1 wherein said access cover comprises a network cover door for the network area and a customer cover door for the customer area.

4. A NID according to claim 3 wherein said network cover door and said customer door extend inwardly from respective opposing longitudinal ends of said access cover to define a joint therebetween aligned in parallel with the minor axis.

5. A NID according to claim 3 wherein said access cover further comprises a cover ring carried by said base; and wherein said network and customer cover doors are each pivotally connected to said cover ring.

6. A NID according to claim 1 wherein said base comprises an elliptical panel and a flange connected to peripheral portions thereof so that said elliptical panel is spaced from forward and rearward ends of said flange.

7. A NID according to claim 1 wherein said cable reel has an elliptical shape.

8. A NID according to claim 1 wherein said cable reel is rotatable; and further comprising a lock for selectively locking said cable reel from rotation.

9. A NID according to claim 1 wherein said cable reel is rotatably carried by said base.

10. A NID according to claim 1 wherein said base comprises a rotatable mounting device for rotatably mounting said base to a mounting surface; and wherein said cable reel is carried by said base and is rotatable therewith.

11. A NID according to claim 10 wherein said rotatable mounting device comprises a bracket to be mounted to the mounting surface and an arbor extending outwardly therefrom; and wherein said base has an opening therein receiving said arbor therethrough.

12. A NID according to claim 1 further comprising:
at least one network device carried by the network area of said base; and
at least one customer device carried by the customer area of said base.

13. A NID according to claim 12 wherein said base comprises an elliptical panel with an array of mounting features associated therewith; and wherein said at least one network device and said at least one customer device are mounted via respective ones of said mounting features.

14. A network interface device (NID) comprising:
a base having an elliptical shape and comprising a network area and a customer area adjacent thereto; and
an access cover comprising a network cover door for the network area and a customer cover door for the customer area;
said access cover having a shape defined by half an ellipsoid with major and minor axes adjacent said base.

15. A NID according to claim 14 wherein said network cover door and said customer cover door extend inwardly from respective opposing longitudinal ends of said access cover to define a joint therebetween aligned in parallel with the minor axis.

16. A NID according to claim 14 wherein said access cover further comprises a cover ring carried by said base; and wherein said network and customer cover doors are each pivotally connected to said cover ring.

17. A NID according to claim 14 wherein said base comprises a rotatable mounting device for rotatably mounting said base to a mounting surface.

18. A NID according to claim 17 wherein said rotatable mounting device comprises a bracket to be mounted to the mounting surface and an arbor extending outwardly therefrom; and wherein said base has an opening therein receiving said arbor therethrough.

19. A NID according to claim 14 further comprising:
at least one network device carried by the network area of said base; and
at least one customer device carried by the customer area of said base.

20. A NID according to claim 19 wherein said base comprises an elliptical panel with an array of mounting features associated therewith; and wherein said at least one network device and said at least one customer device are mounted via respective ones of said mounting features.

21. A network interface device (NID) comprising:
a base comprising a network area and a customer area adjacent thereto;
a cable reel carried by said base; and
an access cover for said cable reel and said base.

22. A NID according to claim 21 wherein said access cover comprises a network cover door for the network area and a customer cover door for the customer area.

23. A NID according to claim 21 wherein said cable reel has an elliptical shape.

24. A NID according to claim 21 wherein said cable reel is rotatable; and further comprising a lock for selectively locking said cable reel from rotation.

25. A NID according to claim 21 wherein said cable reel is rotatably carried by said base.

26. A NID according to claim 21 wherein said base comprises a rotatable mounting device for rotatably mounting said base to a mounting surface; and wherein said cable reel is carried by said base and is rotatable therewith.

27. A NID according to claim 26 wherein said rotatable mounting device comprises a bracket to be mounted to the mounting surface and an arbor extending outwardly therefrom; and wherein said base has an opening therein receiving said arbor therethrough.

28. A NID according to claim 21 further comprising:
at least one network device carried by the network area of said base; and
at least one customer device carried by the customer area of said base.

29. A NID according to claim 28 wherein said base comprises an elliptical panel with an array of mounting features associated therewith; and wherein said at least one network device and said at least one customer device are mounted via respective ones of said mounting features.

30. A method for making network interface device (NID) comprising:
providing a base having an elliptical shape comprising a network area and a customer area adjacent thereto; and
connecting an access cover to the base, the access cover having a shape defined by half an ellipsoid with major and minor axes adjacent the base.

31. A method according to claim 30 wherein the access cover comprises a network cover door for the network area and a customer cover door for the customer area.

32. A method according to claim 31 wherein the network cover door and the customer door extend inwardly from respective opposing longitudinal ends of the access cover to define a joint therebetween aligned in parallel with the minor axis.

33. A method according to claim 31 wherein the access cover further comprises a cover ring carried by the base; and wherein the network and customer cover doors are each pivotally connected to the cover ring.

34. A method according to claim 30 wherein the base comprises a rotatable mounting device for rotatably mounting the base to a mounting surface.

35. A method according to claim 34 wherein the rotatable mounting device comprises a bracket to be mounted to the mounting surface and an arbor extending outwardly therefrom; and wherein the base has an opening therein receiving the arbor therethrough.

36. A method according to claim 30 further comprising:
positioning at least one network device on the network area of the base; and
positioning at least one customer device on the customer area of the base.

37. A method for using a network interface device (NID) comprising a base including a network area and a customer area adjacent thereto and an access cover for the base, the method comprising:
positioning a cable reel within the access cover.

38. A method according to claim 37 wherein the access cover includes a network cover door for the network area and a customer cover door for the customer area.

39. A method according to claim 37 wherein the cable reel has an elliptical shape.

40. A method according to claim 37 wherein the cable reel is rotatable for cable dispensing; and further comprising selectively locking the cable reel from rotation after cable dispensing.

41. A method according to claim 37 wherein the cable reel is rotatably carried by the base.

42. A method according to claim 37 wherein the base comprises a rotatable mounting device for rotatably mounting the base to a mounting surface; and wherein the cable reel is carried by the base and is rotatable therewith.

43. A method according to claim 42 wherein the rotatable mounting device comprises a bracket to be mounted to the mounting surface and an arbor extending outwardly therefrom; and wherein the base has an opening therein receiving the arbor therethrough.

44. A method according to claim 37 wherein the NID further comprises:
- at least one network device carried by the network area of the base; and
- at least one customer device carried by the customer area of the base.

* * * * *